US011956006B2

(12) United States Patent
Meir et al.

(10) Patent No.: US 11,956,006 B2
(45) Date of Patent: Apr. 9, 2024

(54) PRECODING PERTURBATION TO ALLOW LARGE ARRAY DIGITAL POST DISTORTION

(71) Applicant: QUALCOMM Incorporated, San Diego, CA (US)

(72) Inventors: Elad Meir, Ramat Gan (IL); Gideon Shlomo Kutz, Ramat Hasharon (IL); Yaron Laufer, Brookline, MA (US); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/810,499

(22) Filed: Jul. 1, 2022

(65) Prior Publication Data

US 2024/0007142 A1    Jan. 4, 2024

(51) Int. Cl.
*H04B 1/62* (2006.01)
*H04B 7/0456* (2017.01)

(52) U.S. Cl.
CPC ............. *H04B 1/62* (2013.01); *H04B 7/0456* (2013.01)

(58) Field of Classification Search
CPC ................................ H04B 1/62; H04B 7/0456
See application file for complete search history.

(56) References Cited

U.S. PATENT DOCUMENTS 9,362,995 B2 *  6/2016  Nakano ............... H04L 25/0226
2010/0254487 A1 * 10/2010  Lee ..................... H04L 25/0244
                                                              375/295
2011/0038433 A1 *  2/2011  Chen .................. H04L 25/03828
                                                              375/260
2021/0119682 A1   4/2021  Gutman et al.

FOREIGN PATENT DOCUMENTS

WO          2021242483 A1    12/2021

OTHER PUBLICATIONS

International Search Report and Written Opinion—PCT/US2023/067800—ISA/EPO—dated Sep. 12, 2023.
Qualcomm Incorporated: "DL MIMO Transmission Schemes", 3GPP TSG RAN WG1 RAN1 #88, R1-1702598, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017, pp. 1-6, XP051209752, paragraph [02.3].

* cited by examiner

*Primary Examiner* — Vineeta S Panwalkar
(74) *Attorney, Agent, or Firm* — QUALCOMM Incorporated

(57) ABSTRACT

This disclosure provides systems, methods and apparatus, including computer programs encoded on computer storage media, for performing wireless communication using digital post distortion, for example, with a large antenna array where the number of transmit antennas may be greater than a number of spatial streams. A transmitting device and a receiving device determine a perturbed precoding matrix based on a precoding perturbation rule. The transmitting device precodes a signal using the perturbed precoding matrix and transmits via the number of antennas greater than the number of spatial streams. The receiving device receives the signal and subtracts non-linearities from the received signal based on a channel estimation using the perturbed precoding matrix over one or more iterations.

30 Claims, 11 Drawing Sheets

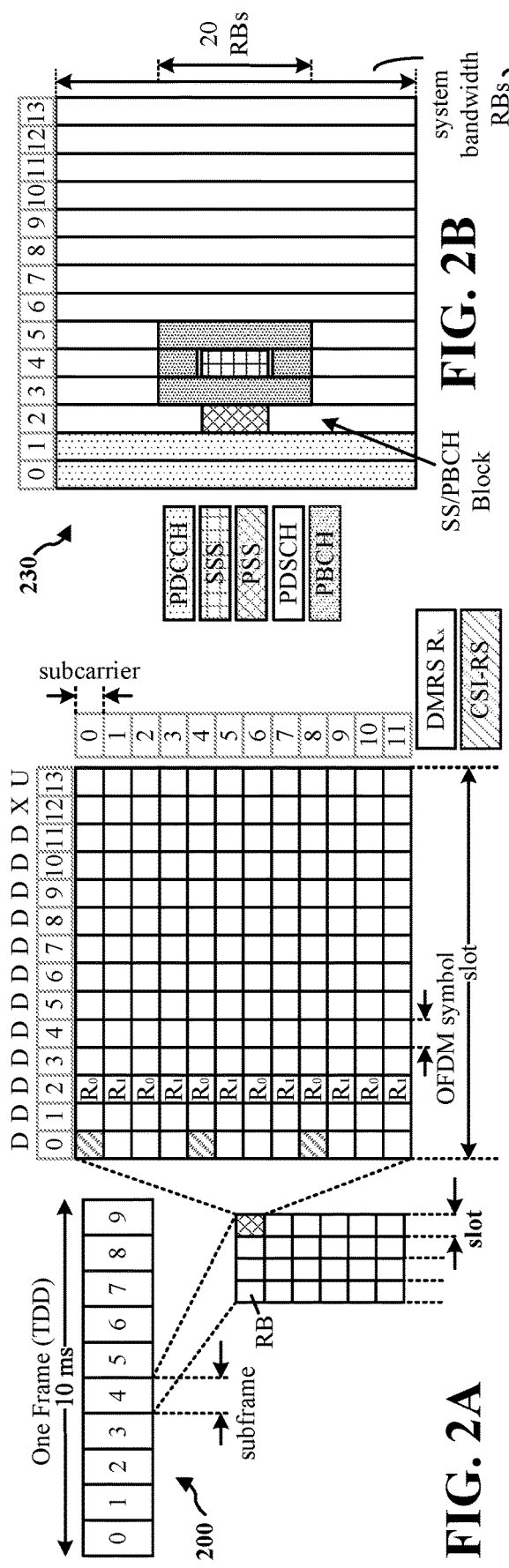
FIG. 2A
FIG. 2B
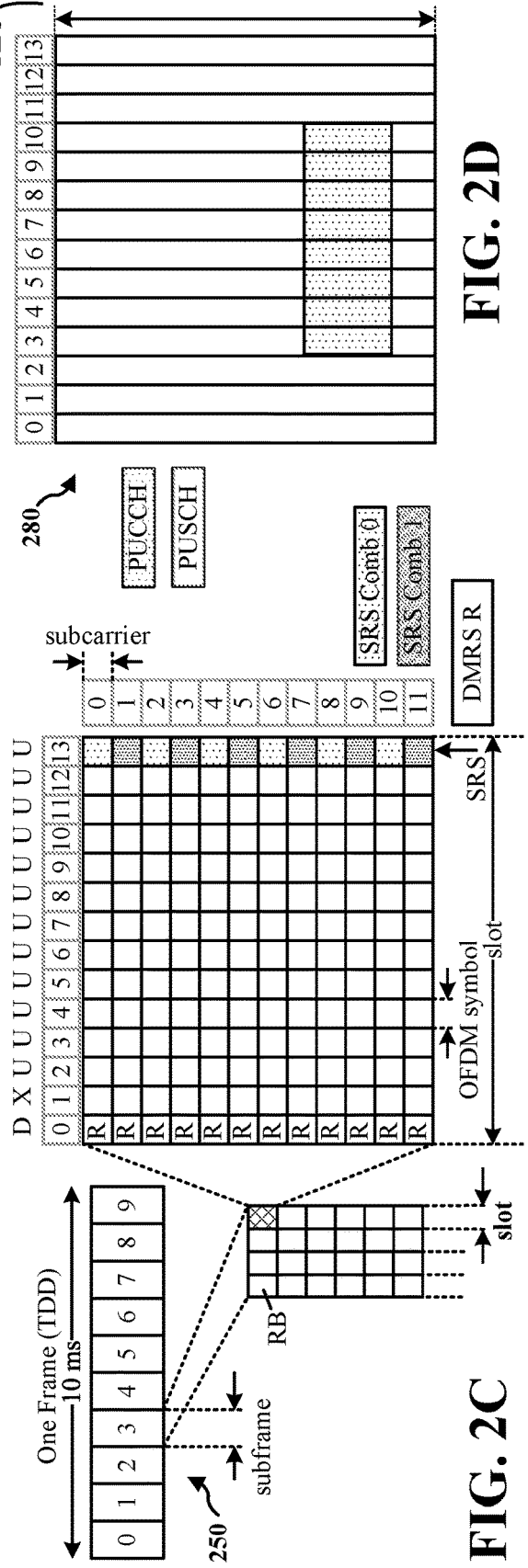
FIG. 2C
FIG. 2D

PRECODING PERTURBATION TO ALLOW LARGE ARRAY DIGITAL POST DISTORTION

TECHNICAL FIELD

The present disclosure relates to wireless communications including precoding perturbation to allow large array digital post distortion.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a receiving device such as a user equipment (UE). The method may include determining a perturbed precoding matrix based on a precoding perturbation rule. The method may include receiving a signal that was generated using digital post distortion based on the perturbed precoding matrix. The method may include subtracting non-linearities from the received signal based on a channel estimation using the perturbed precoding matrix over one or more iterations.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a transmitting device such as a base station (BS). The method may include determining a perturbed precoding matrix based on a precoding perturbation rule. The method may include precoding a signal using the perturbed precoding matrix. The method may include transmitting the signal via a number of antenna ports that is greater than a number of layers of the signal.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
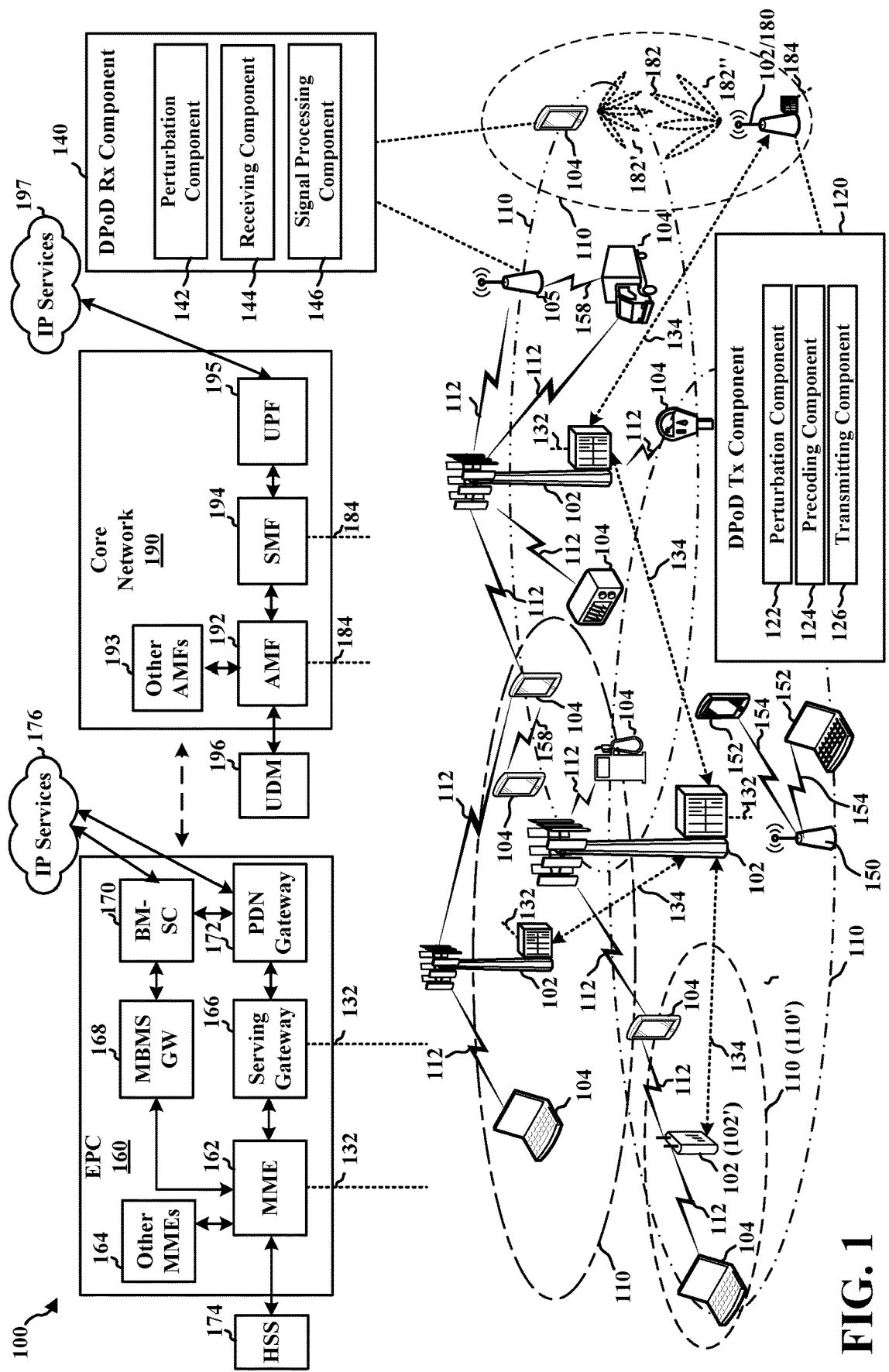
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Multiple-input multiple-output (MIMO) refers to various antenna technologies utilizing multiple antennas, including spatial multiplexing, beamforming, and transmit diversity. Massive MIMO may refer to MIMO techniques utilizing a large array (e.g., at least 16) of antennas or antenna elements. Massive MIMO may be used for multiple users or for beamforming. In the case of a large array, the number of antenna ports may exceed the number of layers, resulting in a non-square precoding matrix.

Digital Post Distortion (DPoD) is a technique that may be used with MIMO to allow the transmit (Tx) side to transmit close to the power amplifier (PA) compression point. On the receiver (Rx) side, the Tx non-linearities are reconstructed and subtracted from the received signal in iterative manner. This technique enables the transmitter to transmit at higher power and improve the signal to noise ratio (SNR) and capacity.

Conventionally, DPoD techniques may be applied to a square precoding case for MIMO. In the square precoding case, the number of antenna ports at the transmitter is equal to the number of layers. With this condition, the precoding matrix is invertible. That is, estimating the precoded channel is enough to also determine the non-precoded channel.

The non-square precoding case presents challenges for DPoD techniques. In the non-square precoding case, the number of antenna ports at the transmitter is higher than the number of layers. In these cases, the demodulation reference signals (DMRS) are allocated per layer and precoded along with the data signal. Because the precoding matrix is not invertible, the receiver cannot efficiently track the channel to each transmitter antenna port. Accordingly, the receiver may be unable to subtract the Tx non-linearities, post channel, from the received signal.

One approach to the non-square precoding case is the use of data-aided channel estimation with dedicated precoding assistance. Such channel estimation may enable continuous tracking of the channel for each of the transmitter antenna ports. Therefore, the use of DPoD for the non-square precoding case may be possible. For example, a data-based pilots vector $x_{tx}$ may be represented as $x_{tx}=P_{tx*layers}s_{layers}$, where: $P_{tx*layers}$ is a precoding matrix with dimensions of the number of tx antennas*the number of layers and $s_{layers}$ is a data vector whose dimension in the number of layers. For every DPoD iteration, the receiver may estimate $s_{layers}$. Then, because $P_{tx*layers}$ is known, the receiver can estimate the pilots $x_{tx}$, which can be used to estimate the channel per Tx antenna. Unlike DMRS, these pilots are not orthogonal in frequency but given enough REs the receiver may have sufficient processing gain to estimate the channel matrix.

One difficulty with this method for DPoD with non-square precoding is that the rank of $P_{tx*layers}$ is the number of layers which will create the set of pilots to be linearly dependent and will prevent estimation of the channel per Tx antenna. For sufficiently frequency selective channels, the precoding will change throughout the allocation and will result in linearly independent pilots. However, for wide band precoding, there may be a rank deficient estimation problem.

In an aspect, the present disclosure provides for precoding perturbation according to a perturbation rule to generate linearly independent signals. A perturbed precoding matrix refers to a precoding matrix that has been altered to generate linearly independent signals. For example, cyclic delay diversity (CDD) may be applied to increase the linear independence of each antenna port. As with other DPoD techniques, the precoding must be known exactly to the receiver. The precoding perturbation rule allows both the transmitter and the receiver to alter the precoding matrix in the same way. Accordingly, the transmitter may precode a signal using the perturbed precoding matrix to generate a digitally distorted signal. The receiver may receive the distorted signal and subtract non-linearities from the distorted signal based on a channel estimation using the perturbed precoding matrix over one or more iterations.

Particular implementations of the subject matter described in this disclosure can be implemented to realize one or more of the following potential advantages. The use of a precoding perturbation rule may allow use of DPoD techniques with non-square precoding matrices. The gains of utilizing a DPoD algorithm can reach more than 10 dB for various cases of array sizes and channel models.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, relay devices 105, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some implementations, one or more of the receiving devices such as UEs 104 or relay devices 105 may include a DPoD Rx component 140 that utilizes a perturbed precoding matrix for channel estimation. The DPoD Rx component 140 may include a perturbation component 142 configured to determine a perturbed precoding matrix based on a precoding perturbation rule. The DPoD Rx component 140 may include a receiving component 144 configured to receive a signal that was generated using digital post distortion based on the perturbed precoding matrix. The DPoD Rx component 140 may include signal processing component 146 configured to subtract non-linearities from the received signal based on a channel estimation using the perturbed precoding matrix over one or more iterations.

In some implementations, one or more of the base stations 102 may include a DPoD Tx component 120 configured to transmit a signal using a perturbed precoding matrix. The DPoD Tx component 120 may include a perturbation component 122 configured to determine a perturbed precoding matrix based on a precoding perturbation rule. The DPoD Tx component 120 may include a precoding component 124 configured to precode a signal using the perturbed precoding matrix. The DPoD Tx component 120 may include a transmitting component 126 configured to transmit the signal via a number of antenna ports that is greater than a number of layers of the signal.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used.

The UE may transmit sounding reference signals (SRS). An SRS resource set configuration may define resources for SRS transmission. For example, as illustrated, a SRS configuration may specify that SRS may be transmitted in the last symbol of a subframe. The SRS may have a comb structure, and a UE may transmit SRS on one comb for each SRS port. The SRS may be used by a base station for channel quality estimation to enable frequency-dependent scheduling on the UL. The SRS may also be used for channel estimation to select a precoder for downlink MIMO.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
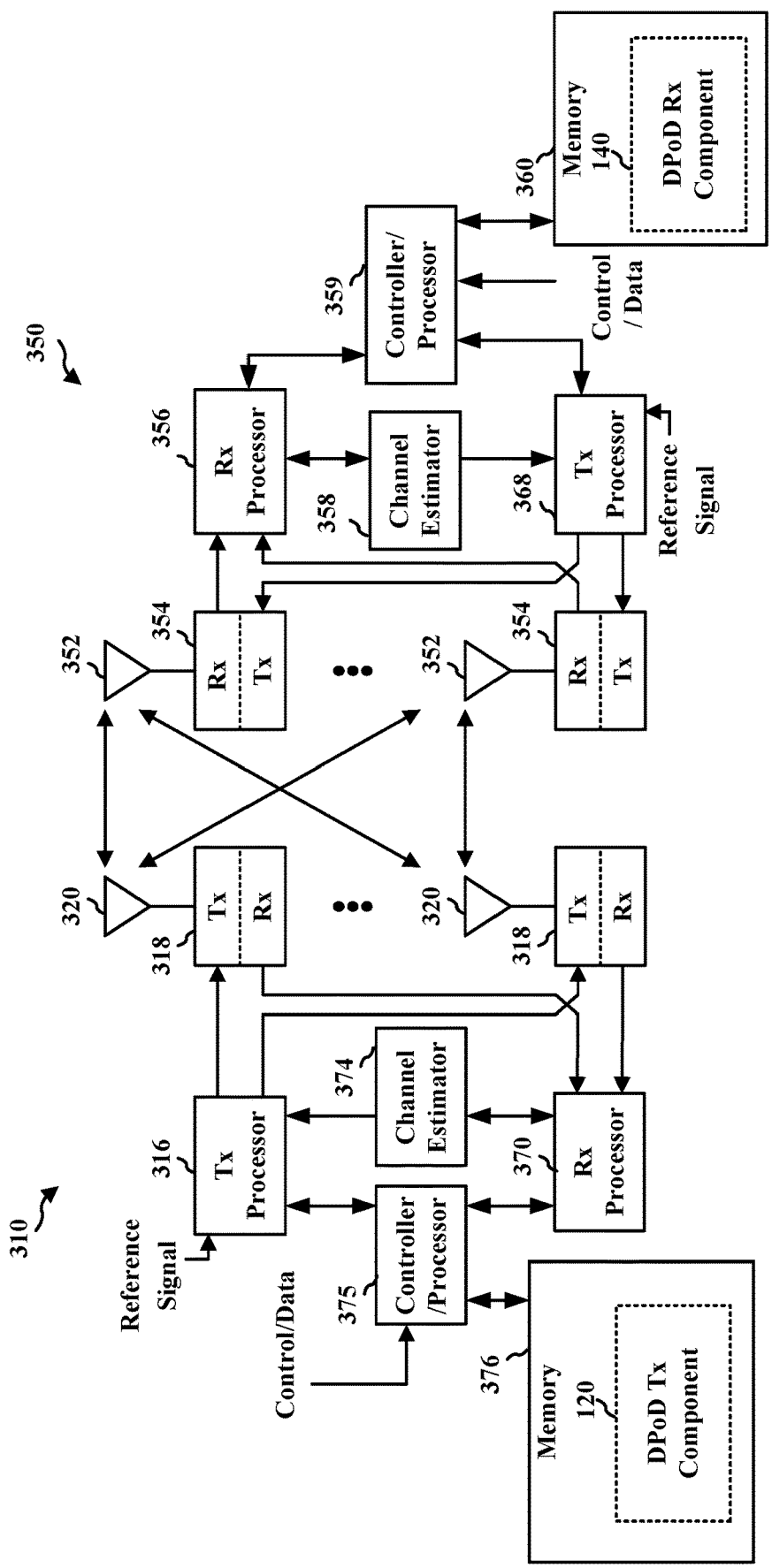
FIG. 3 is a diagram illustrating an example of a base station (BS) and user equipment (UE) in an access network.

FIG. 3 is a diagram of an example of a base station 310 and a UE 350 in an access network. The UE 350 may be an example of a receiving device. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the Tx processor 368, the Rx processor 356, and the controller/processor 359 may be configured to perform aspects in connection with the DPoD Rx component 140 of FIG. 1. For example, the memory 360 may include executable instructions defining the DPoD Rx component 140. The Tx processor 368, the Rx processor 356, and/or the controller/processor 359 may be configured to execute the DPoD Rx component 140.

At least one of the Tx processor 316, the Rx processor 370, and the controller/processor 375 may be configured to perform aspects in connection with the DPoD Tx component 120 of FIG. 1. For example, the memory 376 may include executable instructions defining the DPoD Tx component 120. The Tx processor 316, the Rx processor 370, and/or the controller/processor 375 may be configured to execute the DPoD Tx component 120.

Figure 4:
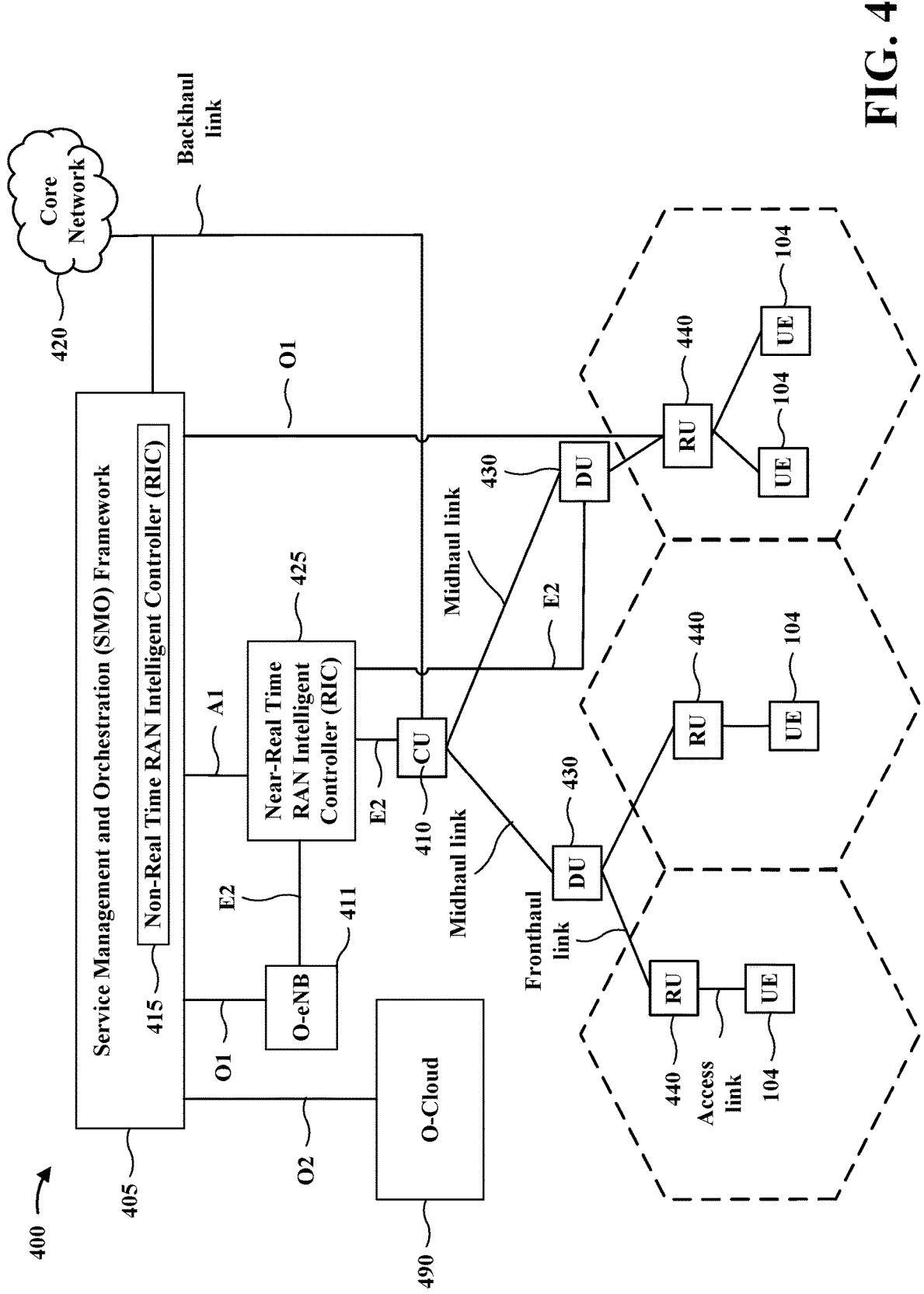
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
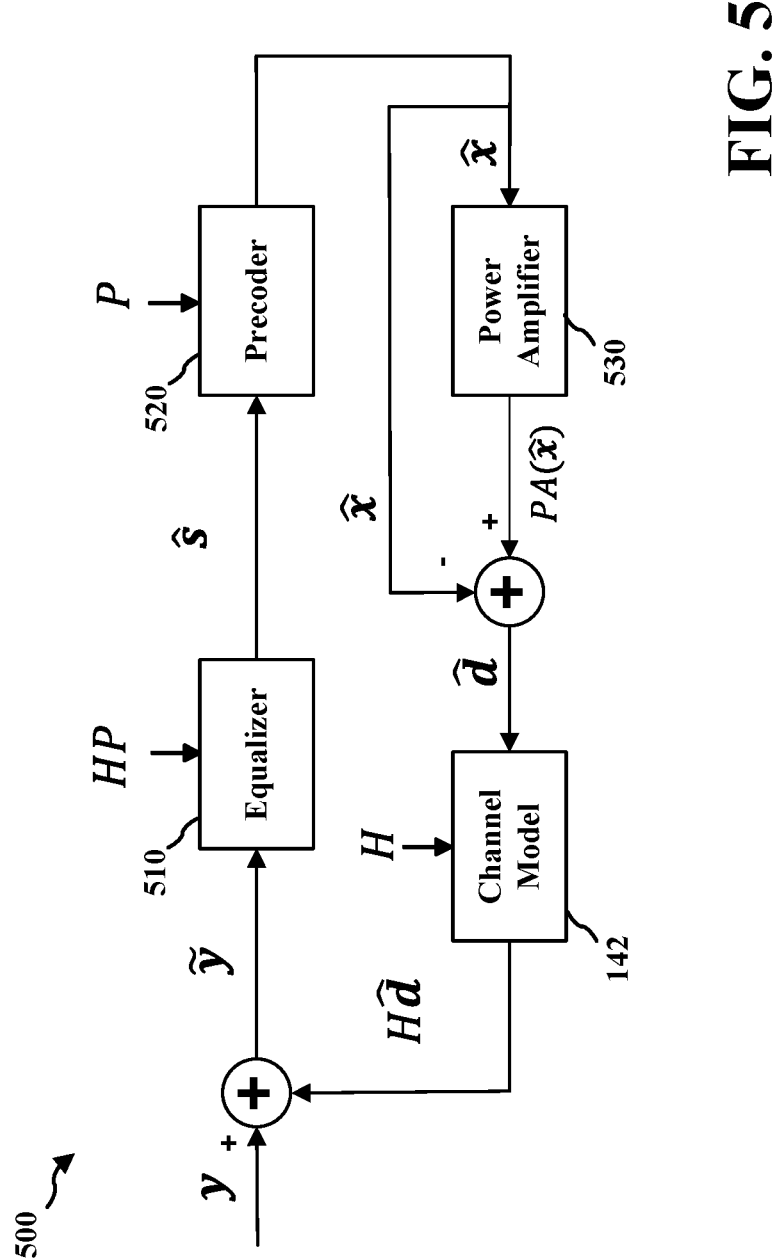
FIG. 5 is a diagram illustrating an example of signal processing of a received signal using digital post distortion (DPoD) techniques over multiple iterations.

FIG. 5 is a diagram 500 illustrating an example of signal processing (e.g., at signal processing component 146) of a received signal (y) using DPoD techniques over multiple iterations. In a first iteration, the received signal is provided to an equalizer 510. The equalizer 510 may be a linear equalizer that estimates transmitted spatial streams (ŝ) based on knowledge of the channel precoding (HP). The estimated spatial streams may be provided to the precoder 520, which is the same as the precoder used by the transmitter. The precoder 520 calculates the estimated precoded transmitted spatial streams (x̂) to serve as pilots. The estimated precoded transmitted spatial streams are provided to a power amplifier 530, which uses a similar power amplifier model as used at the transmitter. The estimated precoded transmitted spatial streams are subtracted from the power amplified estimated precoded transmitted spatial streams to generate the distortion (d̂) of the power amplifier 530. The distortion passes through a channel model (H) 540 to determine non-linearities (Hd̂) of the received signal. The non-linearities are then subtracted from the received signal for a subsequent iteration.

Figure 6:
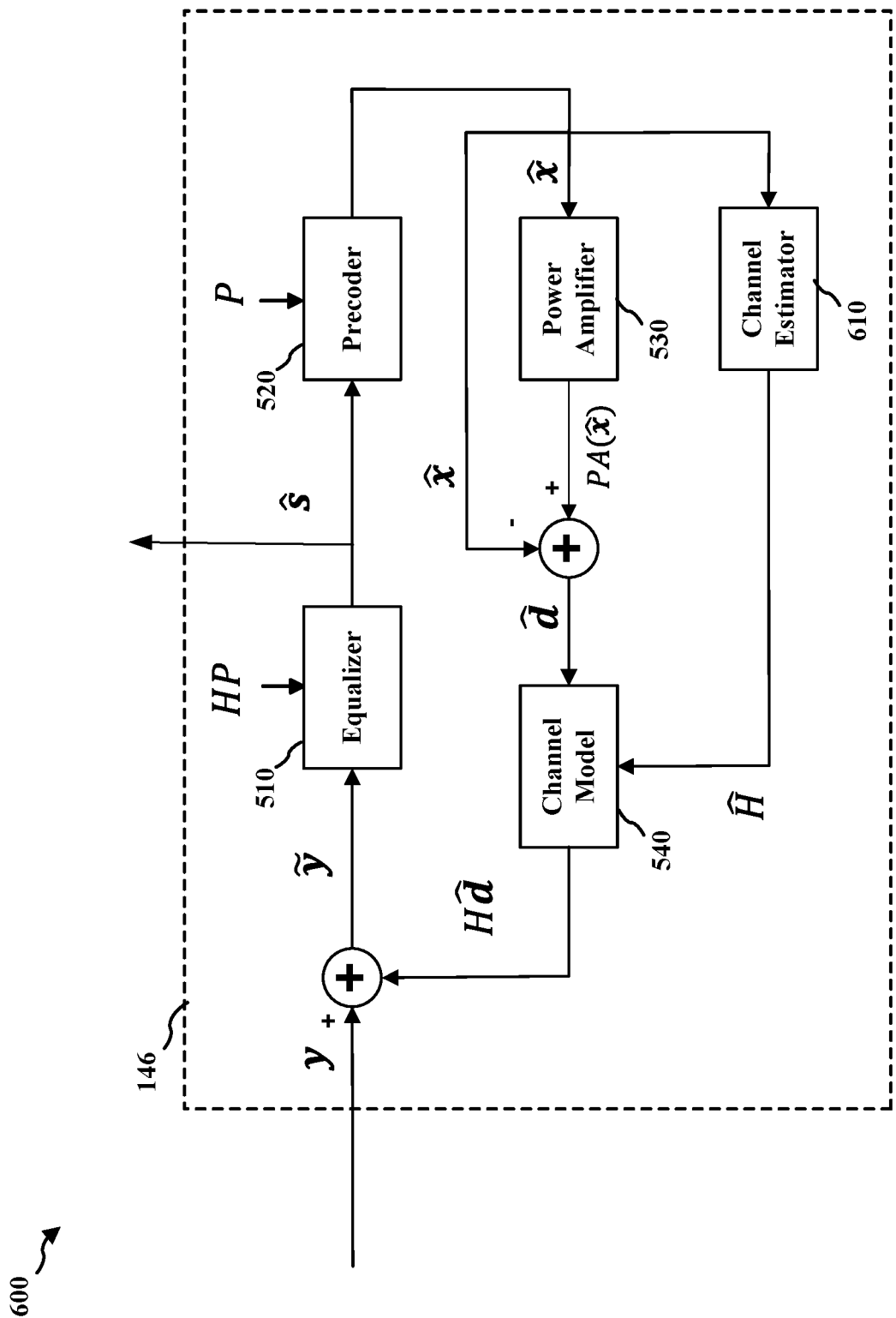
FIG. 6 is a diagram illustrating an example of signal processing of a received signal using DPoD techniques with data-based channel estimation over multiple iterations.

FIG. 6 is a diagram 600 illustrating an example of signal processing (e.g., at signal processing component 146) of a received signal (y) using DPoD techniques with data-based channel estimation over multiple iterations. The signal processing is similar to FIG. 5, with the addition of a channel estimator 610. The channel estimator 610 may utilize data aided channel estimation based on the received signal over multiple symbols. In particular, the estimated precoded transmitted spatial streams (x̂) may be represented as a time domain waveform for each Tx antenna. All symbols and subcarriers of the time domain waveforms may be used to estimate the channel (Ĥ) for all symbols and subcarriers.

For example, the channel estimation to each of the transmitter antenna ports may be estimated using data aided techniques (such as Expectation-Maximization) as part of the iterative process of the DPoD. The receiver signal is of the form: $y = H \cdot P \cdot s + n = H \cdot v + n$, where H is the channel response between Tx antenna ports and Rx ports, P is the precoding matrix, s is the transmitted signal at layer ports, v is the transmitted signal at antenna ports, and n is additive noise. A DMRS based channel estimation of the post precoding channel may be represented as $\hat{H}_{DMRS} \approx H \cdot P$. The equalizer 510 may estimate the transmitted signal at layer ports according to $\hat{s} = \min\{\|y - \hat{H}_{DMRS} \cdot s\|^2\}$. The Tx antenna port signal (ṽ) may be evaluated by applying the precoding matrix on the estimated transmitted symbol. That is, $\tilde{v} = P \cdot \hat{s}$. Because the precoding matrix P is perturbed, ṽ for each antenna port may be linearly independent. Accordingly, the evaluated Tx antenna port signals may be used as pilots to estimate the channel response, $\hat{H}: \|y - \hat{H} \cdot \tilde{v}\|^2 \to 0$. The estimated channel Ĥ may then be used as the channel model to determine the non-linearities (Ĥd̂) of the received signal which may be subtracted from the received signal y for a subsequent iteration.

In some cases, the Tx antenna port signals may be linearly dependent. For example, when wide band precoding is used, the rank of P may be the number of layers that creates a set of linearly dependent pilots, which prevents estimation of the channel per Tx antenna. In an aspect, the precoder at the transmitter may utilize a perturbed precoding matrix that distorts the Tx antenna port signals to avoid linear dependency. For example, a different cyclic delay diversity (CDD) may be applied to each antenna of the baseline wideband precoder. However, because DPoD at the receiver relies on the precoder 520 to estimate the precoded transmitted spatial streams, the precoder 520 may use the same perturbed precoding matrix. The transmitter and the receiver may both determine the perturbed precoding matrix according to a perturbation rule. For example, the perturbation rule may define how the precoding matrix is changed from a dynamically determined precoding matrix (e.g., based on a precoding matrix indicator (PMI) and/or scheduling (e.g., a downlink control information (DCI)).

Figure 7:
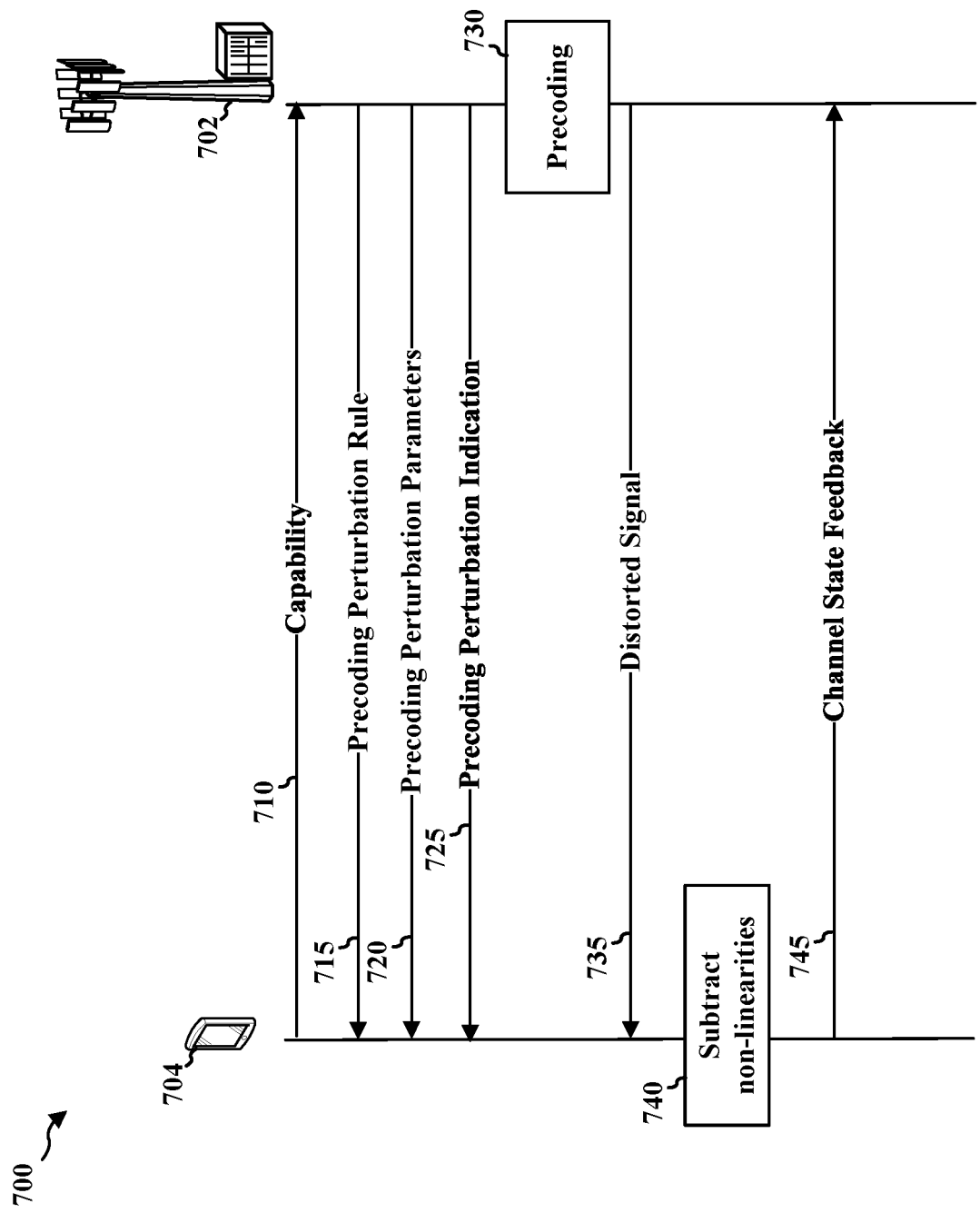
FIG. 7 is a message diagram illustrating example messages between a transmitting device and a receiving device for using a perturbed precoding matrix.

FIG. 7 is a message diagram 700 illustrating example messages between a transmitting device 702 and a receiving device 704 for using a perturbed precoding matrix. The receiving device 704 may transmit a capability message 710 to the transmitting device 702. The capability message 710 may indicate, for example, that the receiving device 704 is capable of perturbing a precoder based on a perturbation rule.

In some implementations, the perturbation rule may be defined in a standards document or regulation. For example, the standards document may define a formula for determining a CDD to apply to each Tx antenna. In some implementations, the transmitting device (e.g., a base station) may transmit a control message indicating the precoding perturbation rule. For instance, the transmitting device 702 may transmit the precoding perturbation rule 715 on a broadcast channel, in system information, or in an RRC configuration message. In some implementations, the precoding perturbation rule may be defined (e.g., in a standards document) and the transmitting device 702 may transmit one or more precoding perturbation parameters 720. For example, the precoding perturbation parameters 720 may include a number of delays of the CDD. In some implementations, the precoding perturbation may be conditionally applied. For instance, the precoding perturbation for a transmission may be in response to the transmitting device 702 receiving the capability message 710 indicating that the receiving device is capable of precoding perturbation. In some implementations, when the transmitting device 702 selects precoding perturbation, the transmitting device 702 may transmit a precoding perturbation indication 725. For instance, the precoding perturbation indication 725 may be a flag in a DCI.

At block 730, the transmitting device 702 may perform precoding for a transmission based on the perturbed precoding matrix. The transmitting device 702 may then transmit a signal generated based on the perturbed precoding matrix. During the transmission process, a power amplifier may distort the signal such that a distorted signal 735 is transmitted At block 740, the receiving device 704 may process the distorted signal 735 to subtract non-linearities. For example, for a non-square precoding case, the receiving device 704 may process the distorted signal 735 according to FIG. 6. The precoder 520 may be based on the perturbed precoding matrix.

The receiving device 704 may provide channel state feedback 745 such as an updated PMI to be used for subsequent transmissions.

Figure 8:
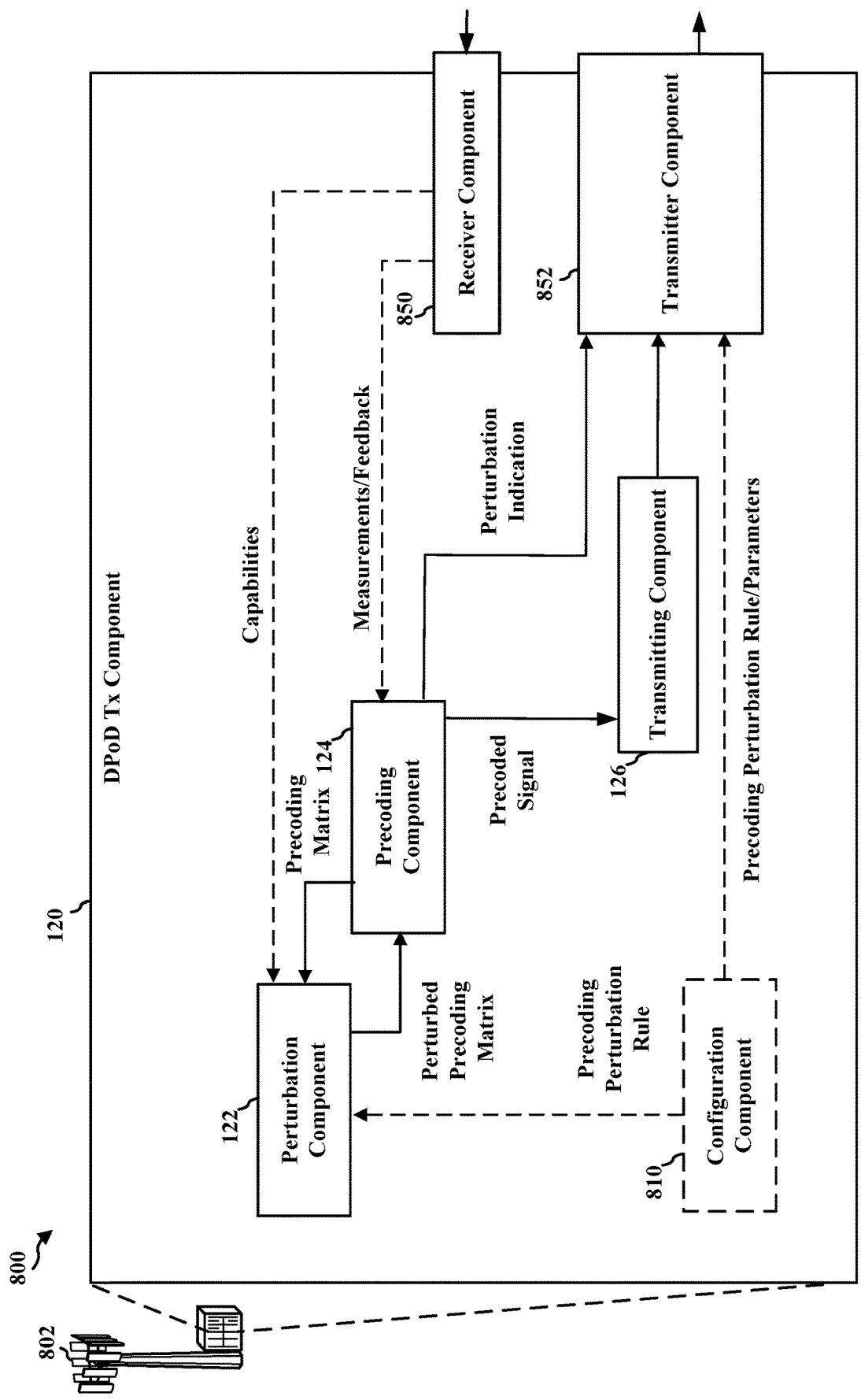
FIG. 8 is a conceptual data flow diagram illustrating the data flow between different means/components in an example transmitting device.

FIG. 8 is a conceptual data flow diagram 800 illustrating the data flow between different means/components in an example transmitting device 802, which may be an example of the base station 102 including the DPoD Tx component 120. The DPoD Tx component 120 may be implemented by the memory 376 and the Tx processor 316, the Rx processor 370, and/or the controller/processor 375 of FIG. 3. For example, the memory 376 may store executable instructions defining the DPoD Tx component 120 and the Tx processor 316, the Rx processor 370, and/or the controller/processor 375 may execute the instructions.

The transmitting device 802 may include a receiver component 850, which may include, for example, a radio frequency (RF) receiver for receiving the signals described herein. The transmitting device 802 may include a transmitter component 852, which may include, for example, an RF transmitter for transmitting the signals described herein. In an aspect, the receiver component 850 and the transmitter component 852 may co-located in a transceiver such as illustrated by the Tx/Rx 318 in FIG. 3.

As discussed with respect to FIG. 1, the DPoD Tx component 120 may include the perturbation component 122, the precoding component 124, and the transmitting component 126. In some implementations, the DPoD Tx component 120 may optionally include a configuration component 810 for configuring a perturbation rule.

The receiver component 850 may receive UL signals from the receiving device 704 including the capability message 710 or the channel state feedback 745. The receiver component 850 may provide the capability message 710 to the perturbation component 122 and/or the configuration component 810. The receiver component 850 may provide the channel state feedback (e.g., a PMI) to the precoding component 124.

The configuration component 810 may be configured to determine the precoding perturbation rule and configure other components and devices with the precoding perturbation rule. For example, the configuration component 810 may select the perturbation rule or parameters thereof based on properties of the transmitter component 852 (e.g., number of Tx antenna ports). In some implementations, the configuration component 810 may transmit the precoding perturbation rule and/or parameters of the precoding perturbation rule to receiving devices via a broadcast channel, system information, or RRC messages. The configuration component 810 may configure the perturbation component 122 with the perturbation rule.

The perturbation component 122 may be configured to determine a perturbed precoding matrix based on a precoding perturbation rule. The perturbation component 122 may receive the precoding perturbation rule from the configuration component 810. The perturbation component 122 may receive the precoding matrix from the precoding component 124. In some implementations, the perturbation component 122 may determine whether to apply the precoding perturbation rule to the precoding matrix in response to the capability message 710 from the receiving device. For example, the perturbation component 122 may apply the precoding perturbation rule to the precoding matrix for receiving devices capable of using the perturbed precoding matrix. The perturbation component 122 may provide the perturbed precoding matrix to the precoding component 124.

The precoding component 124 may receive measurements and/or feedback (e.g., PMI) from receiving devices 704 via the receiver component 850. The precoding component 124 may select a precoding matrix based on the measurements and/or feedback. The precoding matrix may include narrow band precoding or wide band precoding. In some implementations, narrow band precoding with enough variations over frequency may result in linearly independent pilots. In implementations, where the narrow band precoding does not vary significantly, precoding perturbation may be applied. Generally, the precoding perturbation may be applied for wideband precoding. The precoding component 124 may provide the precoding matrix for a transmission to the perturbation component 122 and receive a perturbed precoding matrix. The precoding component 124 may then precode a signal using the perturbed precoding matrix. The precoding component 124 may provide the precoded signal to the transmitting component 126. In some implementations, the precoding component 124 may provide a perturbation indication to the transmitter component 852 for transmission to one or more receiving devices (e.g., in a DCI scheduling a transmission using a perturbed precoding matrix).

The transmitting component 126 may receive the precoded signal from the precoding component 124. The transmitting component 126 may transmit the signal via a number of antenna ports (of the transmitter component 852) that is greater than a number of layers of the signal.

Figure 9:
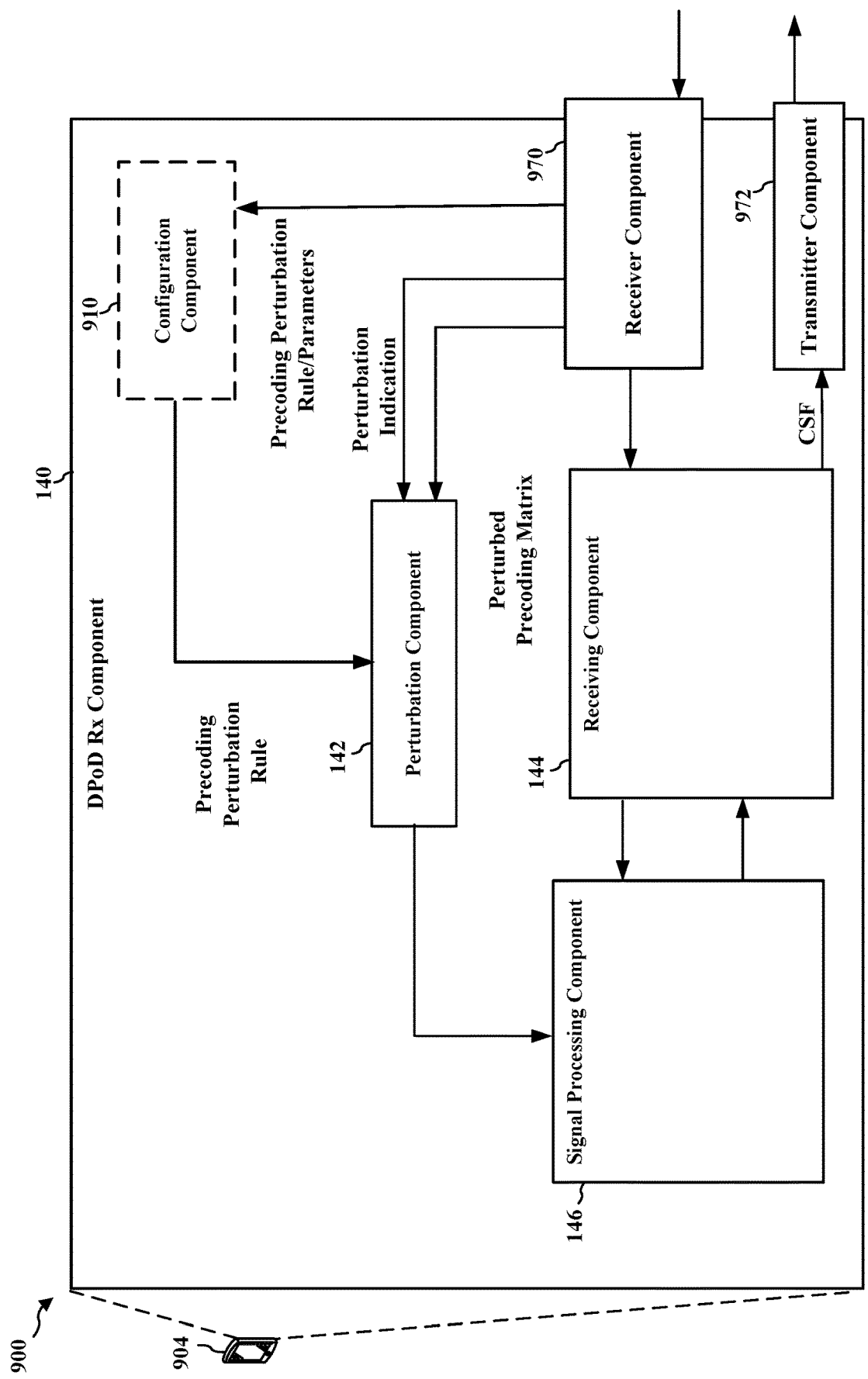
FIG. 9 is a conceptual data flow diagram illustrating the data flow between different means/components in an example receiving device.

FIG. 9 is a conceptual data flow diagram 900 illustrating the data flow between different means/components in an example receiving device 904, which may be an example of the receiving device 704, the UE 104, or the relay device 105 and include the DPoD Rx component 140. The DPoD Rx component 140 may be implemented by the memory 360 and the Tx processor 368, the Rx processor 356, and/or the controller/processor 359. For example, the memory 360 may store executable instructions defining the DPoD Rx component 140 and the Tx processor 368, the Rx processor 356, and/or the controller/processor 359 may execute the instructions.

The receiving device 904 may include a receiver component 970, which may include, for example, a RF receiver for receiving the signals described herein. The receiving device 904 may include a transmitter component 972, which may include, for example, an RF transmitter for transmitting the signals described herein. In an aspect, the receiver component 970 and the transmitter component 972 may co-located in a transceiver such as the Tx/Rx 352 in FIG. 3.

As discussed with respect to FIG. 1, the DPoD Rx component 140 may include the perturbation component 142, the receiving component 144, and the signal processing component 146. In some implementations, the DPoD Rx component 140 may optionally include a configuration component 910.

The receiver component 970 may receive DL signals described herein such as the precoding perturbation rule 715, the precoding perturbation parameters 720, the precoding perturbation indication 725, the digital post distortion signal 735, and downlink communications. The receiver component 970 may provide the precoding perturbation rule 715 and/or the precoding perturbation parameters 720 to the configuration component 910 and/or the perturbation component 142. The receiver component 970 may provide the precoding perturbation indication 725 to the perturbation component 142. The receiver component 970 may provide the digital post distortion signal 735 to the receiving component 144.

In some implementations, the configuration component 910 may be configured to determine a current precoding perturbation rule. The configuration component 910 may receive the precoding perturbation rule 715 and/or the precoding perturbation parameters 720 from a transmitting device via the receiver component 970. In some implementations, the configuration component 910 may be configured with the precoding perturbation rule based on a standards document or regulation. The configuration component 910 may configure the perturbation component 142 with the precoding perturbation rule.

The perturbation component 142 may be configured with the precoding perturbation rule by the configuration component 910. In some implementations, the perturbation component 142 may receive a perturbation indication from a transmitting device via the receiver component 970. The perturbation component 142 may apply the precoding perturbation rule to a precoding matrix to determine a perturbed precoding matrix. The perturbation component 142 may provide the perturbed precoding matrix to the signal processing component 146.

The receiving component 144 may receive a signal that was generated using digital post distortion based on the perturbed precoding matrix. For example, the receiving component 144 may receive the digital post distortion signal 735 from the transmitting device 702 via the receiver component 970. The receiving component 144 may provide the digital post distortion signal 735 to the signal processing component 146 to subtract non-linearities. The receiving component 144 may receive a higher quality signal (e.g., $\tilde{y}$ or $\hat{s}$ after one or more iterations). The receiving component 144 may decode the higher quality signal. In some implementations, the receiving component 144 may provide channel state feedback to the transmitting device via the transmitter component 972.

The signal processing component 146 may be configured to subtract non-linearities from the received signal based on a channel estimation using the perturbed precoding matrix over one or more iterations. For example, the signal processing component 146 may receive the received signal (y) from the receiving component 144. The signal processing component 146 may be configured according to FIG. 6 to subtract non-linearities based on the perturbed precoding matrix and data aided channel estimation. The signal processing component 146 may provide a higher quality signal (e.g., $\tilde{y}$ or $\hat{s}$ after one or more iterations) back to the receiving component 144.

Figure 10:
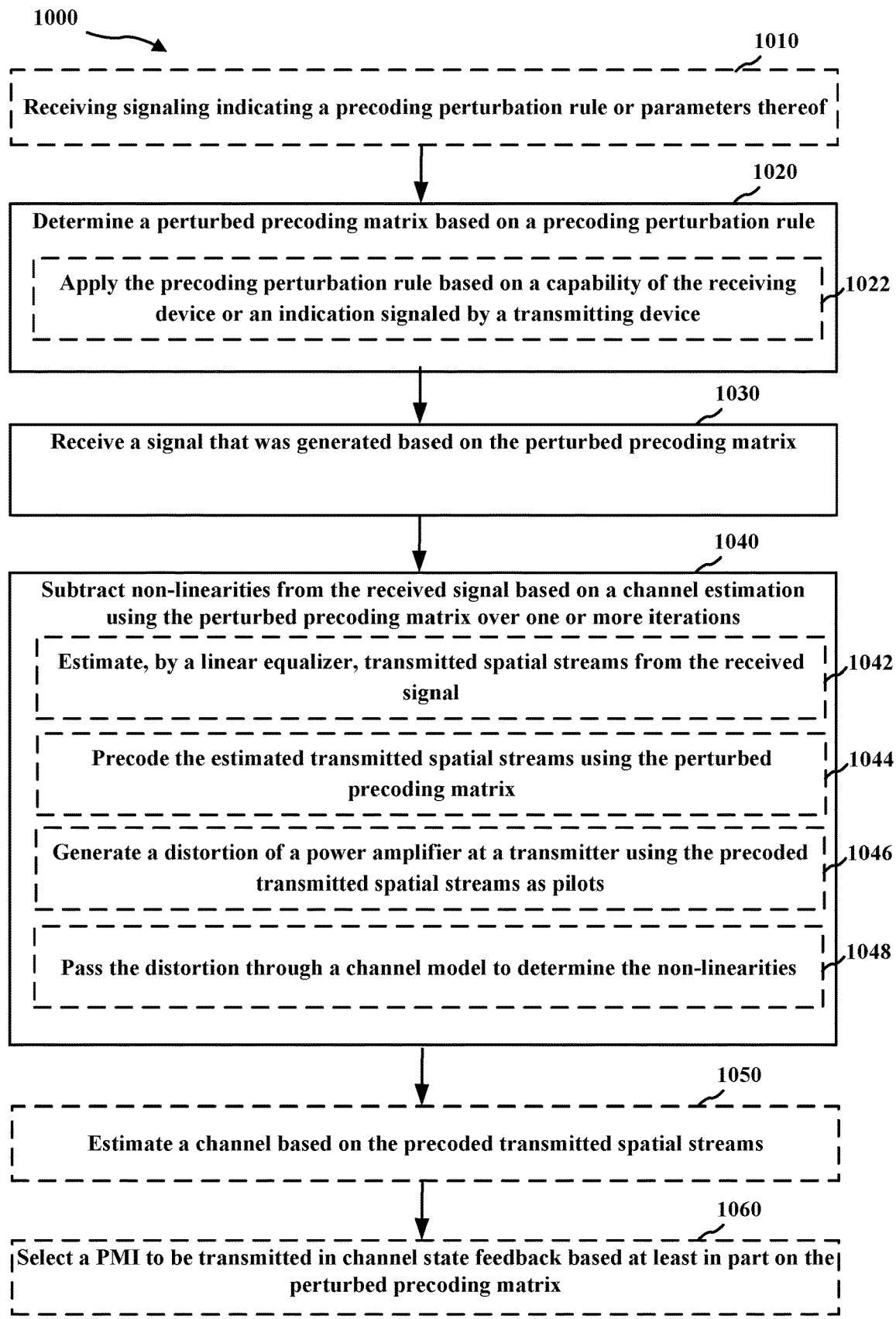
FIG. 10 is a flowchart of an example method for a receiving device to receive a signal using DPoD techniques and a perturbed precoding matrix over multiple iterations.

FIG. 10 is a flowchart of an example method 1000 for a receiving device (e.g., receiving device 904) to receive a signal using DPoD techniques and a perturbed precoding matrix over multiple iterations. The method 1000 may be performed by a receiving device 904 (such as the UE 104 or relay device 105, which may include the memory 360 and which may be the entire UE 104 or a component of the UE 104 such as the DPoD Rx component 140, Tx processor 368, the Rx processor 356, or the controller/processor 359). The method 1000 may be performed by the DPoD Rx component 140 in communication with the DPoD Tx component 120 of the base station 102. Optional blocks are shown with dashed lines.

At block 1010, the method 1000 may optionally include receiving signaling indicating a precoding perturbation rule or parameters thereof. In some implementations, for example, the UE 104, the Rx processor 356 or the controller/processor 359 may execute the DPoD Rx component 140 or the configuration component 910 to receive signaling indicating the precoding perturbation rule 715 or the precoding perturbation parameters 720. Accordingly, the UE 104, the Rx processor 356, or the controller/processor 359 executing the DPoD Rx component 140 or the configuration component 910 may provide means for receiving signaling indicating a precoding perturbation rule or parameters thereof.

At block 1020, the method 1000 may include determining a perturbed precoding matrix based on a precoding perturbation rule. In some implementations, for example, the UE 104, the Rx processor 356 or the controller/processor 359 may execute the DPoD Rx component 140 or the perturbation component 142 to determine the perturbed precoding matrix based on the precoding perturbation rule. In some implementations, at sub-block 1022, the block 1020 may optionally include applying the precoding perturbation rule based on a capability of the receiving device or an indication signaled by a transmitting device. For instance the perturbation component 142 may apply the perturbation rule in response to transmitting the capability message 710 or receiving the precoding perturbation indication 725. In some implementations, the precoding perturbation rule applies a cyclic delay diversity (CDD) across a wideband precoder. For example, the parameters may define an amount of delay. Accordingly, the UE 104, the Rx processor 356, or the controller/processor 359 executing the DPoD Rx component 140 or the perturbation component 142 may provide means for determining a perturbed precoding matrix based on a precoding perturbation rule.

At block 1030, the method 1000 may include receiving a signal that was generated using digital post distortion based on the perturbed precoding matrix. In some implementations, for example, the UE 104, the Rx processor 356 or the controller/processor 359 may execute the DPoD Rx component 140 or the receiving component 144 to receive the digital post distortion signal 735 that was generated using digital post distortion based on the perturbed precoding matrix. Accordingly, the UE 104, the Rx processor 356, or the controller/processor 359 executing the DPoD Rx component 140 or the receiving component 144 may provide means for receiving a signal that was generated using digital post distortion based on the perturbed precoding matrix.

At block 1040, the method 1000 may include subtracting non-linearities from the received signal based on a channel estimation using the perturbed precoding matrix over one or more iterations. In some implementations, for example, the UE 104, the Rx processor 356, the Tx processor 368, or the controller/processor 359 may execute the DPoD Rx component 140 or the signal processing component 146 to subtract non-linearities from the received signal based on a channel estimation using the perturbed precoding matrix over one or more iterations. For example, at sub-block 1042, the block 1040 may optionally include estimating, by a linear equalizer (e.g., equalizer 510), transmitted spatial streams from the received signal. As another example, at sub-block 1044, the block 1040 may optionally include precoding the estimated transmitted spatial streams using the perturbed precoding matrix. As another example, at sub-block 1046, the block 1040 may optionally include generating a distortion (e.g., d) of a power amplifier at a transmitter using the precoded transmitted spatial streams (e.g., 2) as pilots. As another example, at sub-block 1048, the block 1040 may optionally include passing the distortion through a channel model 540 to determine the non-linearities (e.g., Hd). In some implementations, the sub-block 1042, 1044, 1046, and 1048 may repeat over one or more iterations. Accordingly, the UE 104, the Rx processor 356, the Tx processor 368, or the controller/processor 359 executing the DPoD Rx component 140 or the signal processing component 146 may provide means for subtracting non-linearities from the received signal based on a channel estimation using the perturbed precoding matrix over one or more iterations.

At block 1050, the method 1000 may optionally include estimating a channel based on the precoded transmitted spatial streams. In some implementations, for example, the UE 104, the Rx processor 356, or the controller/processor 359 may execute the DPoD Rx component 140, the signal processing component 146, or the channel estimator 610 to estimate a channel based on the precoded transmitted spatial streams. Accordingly, the UE 104, the Rx processor 356, the Tx processor 368, or the controller/processor 359 executing the DPoD Rx component 140 the signal processing component 146, or the channel estimator 610 may provide means for estimating a channel based on the precoded transmitted spatial streams.

At block 1060, the method 1000 may optionally include selecting a PMI to be transmitted in channel state feedback based at least in part on the perturbed precoding matrix. In some implementations, for example, the UE 104, the Tx processor 368, or the controller/processor 359 may execute the DPoD Rx component 140 or the receiving component 144 to select a PMI to be transmitted in channel state feedback based at least in part on the perturbed precoding matrix. Accordingly, the UE 104, the Tx processor 368, or the controller/processor 359 executing the DPoD Rx component 140 or the receiving component 144 may provide means for selecting a PMI to be transmitted in channel state feedback based at least in part on the perturbed precoding matrix.

Figure 11:
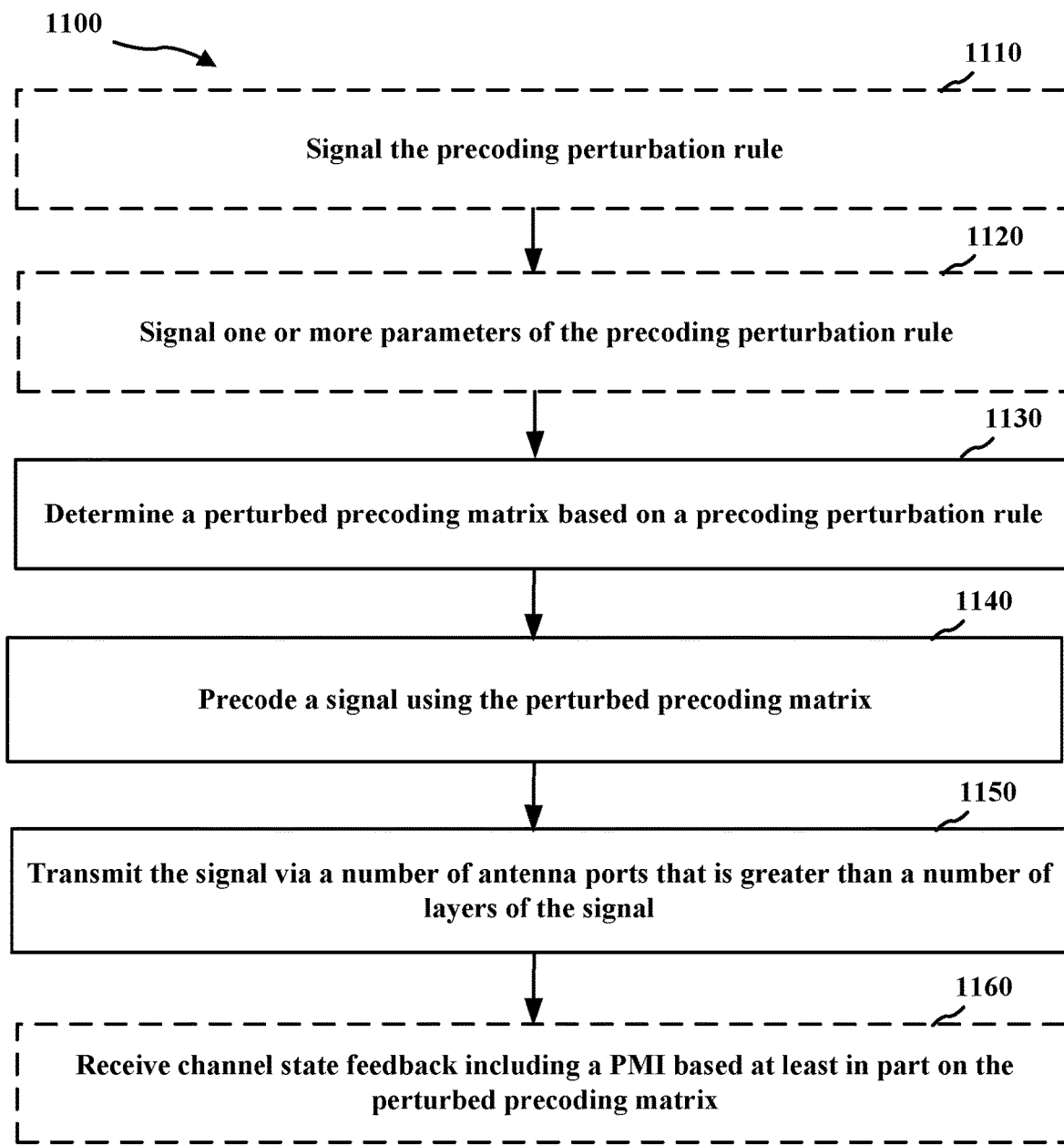
FIG. 11 is a flowchart of an example method for a base station to transmit a signal using DPoD techniques based on a perturbed precoding matrix.

FIG. 11 is a flowchart of an example method 1100 for a base station to transmit a signal using DPoD techniques based on a perturbed precoding matrix. The method 1100 may be performed by a base station (such as the base station 102, which may include the memory 376 and which may be the entire base station 102 or a component of the base station 102 such as the DPoD Tx component 120, the Tx processor 316, the Rx processor 370, or the controller/processor 375). The method 1100 may be performed by the DPoD Tx component 120 in communication with the DPoD Rx component 140 of the UE 104.

At block 1110, the method 1100 may optionally include signaling the precoding perturbation rule. In some implementations, for example, the base station 102, the Tx processor 316, or the controller/processor 375 may execute the DPoD Tx component 120 or the configuration component 810 to signal the precoding perturbation rule 715. Accordingly, the base station 102, the Tx processor 316, or the controller/processor 375 executing the DPoD Tx component 120 or the configuration component 810 may provide means for signaling the precoding perturbation rule.

At block 1120, the method 1100 may optionally include signaling one or more parameters of the precoding perturbation rule. In some implementations, for example, the base station 102, the Tx processor 316, or the controller/processor 375 may execute the DPoD Tx component 120 or the configuration component 810 to signal one or more parameters (e.g., precoding perturbation parameters 720) of the precoding perturbation rule. Accordingly, the base station 102, the Tx processor 316, or the controller/processor 375 executing the DPoD Tx component 120 or the configuration component 810 may provide means for signaling one or more parameters of the precoding perturbation rule.

At block 1130, the method 1300 may include determining a perturbed precoding matrix based on a precoding perturbation rule. In some implementations, for example, base station 102, the Tx processor 316, or the controller/processor 375 may execute the DPoD Tx component 120 or the perturbation component 122 to determine the perturbed precoding matrix based on the precoding perturbation rule. Accordingly, the base station 102, the Tx processor 316, or the controller/processor 375 executing the DPoD Tx component 120 or the mode selection component 124 may provide means for determining a perturbed precoding matrix based on a precoding perturbation rule.

At block 1140, the method 1100 may include precoding a signal using the perturbed precoding matrix. In some implementations, for example, the base station 102, the Tx processor 316, or the controller/processor 375 may execute the DPoD Tx component 120 or the precoding component 124 to precode a signal (e.g., a PDSCH) using the perturbed precoding matrix. Accordingly, the base station 102, the Tx processor 316, or the controller/processor 375 executing the DPoD Tx component 120 or the precoding component 124 may provide means for precoding a signal using the perturbed precoding matrix.

At block 1150, the method 1100 may include transmitting the signal via a number of antenna ports that is greater than a number of layers of the signal. In some implementations, for example, base station 102, the Tx processor 316, or the controller/processor 375 may execute the DPoD Tx component 120 or the transmitting component 126 to transmit the signal via a number of antenna ports that is greater than a number of layers of the signal. Accordingly, the base station 102, the Tx processor 316, or the controller/processor 375 executing the DPoD Tx component 120 or the transmitting component 126 may provide means for transmitting the signal via a number of antenna ports that is greater than a number of layers of the signal.

At block 1160, the method 1100 may optionally include receiving channel state feedback including a PMI based at least in part on the perturbed precoding matrix. In some implementations, for example, base station 102, the Rx processor 370, or the controller/processor 375 may execute the DPoD Tx component 120 or the receiver component 850 to receive channel state feedback including a PMI based at least in part on the perturbed precoding matrix. Accordingly, the base station 102, the Rx processor 370, or the controller/processor 375 executing the DPoD Tx component 120 or the receiver component 850 may provide means for receiving channel state feedback including a PMI based at least in part on the perturbed precoding matrix.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The following provides an overview of aspects of the present disclosure:

Aspect 1: A method of wireless communication at a receiving device, comprising: determining a perturbed precoding matrix based on a precoding perturbation rule; receiving a signal that was generated based on the perturbed precoding matrix; and subtracting non-linearities from the received signal based on a channel estimation using the perturbed precoding matrix over one or more iterations.

Aspect 2: The method of Aspect 1, wherein the precoding perturbation rule applies a cyclic delay diversity (CDD) across a wideband precoder.

Aspect 3: The method of Aspect 1 or 2, wherein the precoding perturbation rule is signaled by a transmitting device.

Aspect 4: The method of Aspect 1 or 2, wherein the precoding perturbation rule is defined in a regulation or standards document.

Aspect 5: The method of Aspect 1 or 2, wherein one or more parameters of the precoding perturbation rule are signaled by a transmitting device.

Aspect 6: The method of any of Aspects 1-5, wherein the perturbed precoding matrix is applied based on a capability of the receiving device or an indication signaled by a transmitting device.

Aspect 7: The method of any of Aspects 1-7, further comprising selecting a precoding matrix indicator (PMI) to be transmitted in channel state feedback based at least in part on the perturbed precoding matrix.

Aspect 8: The method of Aspect 7, wherein a PMI indicating narrow band precoding includes an indication of a request to use the perturbed precoding matrix.

Aspect 9: The method of Aspect 7, wherein the channel state feedback includes one or more parameters of the precoding perturbation rule.

Aspect 10: The method of any of Aspects 1-9, wherein subtracting the non-linearities from the received signal over an iteration of the one or more iterations comprises: estimating, by a linear equalizer, transmitted spatial streams from the received signal; precoding the estimated transmitted spatial streams using the perturbed precoding matrix; generating a distortion of a power amplifier at a transmitter using the precoded transmitted spatial streams as pilots; and passing the distortion through a channel model to determine the non-linearities.

Aspect 11: The method of Aspect 10, further comprising estimating a channel based on the precoded transmitted spatial streams.

Aspect 12: The method of any of Aspects 1-10, wherein a number of antenna ports at a transmitting device is greater than a number of layers of the signal.

Aspect 13: A method of wireless communication at a transmitting device, comprising: determining a perturbed precoding matrix based on a precoding perturbation rule; precoding a signal using the perturbed precoding matrix; and transmitting the signal via a number of antenna ports that is greater than a number of layers of the signal.

Aspect 14: The method of Aspect 13, wherein the precoding perturbation rule applies a cyclic delay diversity (CDD) across a wideband precoder.

Aspect 15: The method of Aspect 13 or 14, further comprising signaling the precoding perturbation rule.

Aspect 16: The method of Aspect 13 or 14, wherein the precoding perturbation rule is defined in a regulation or standards document.

Aspect 17: The method of Aspect 13 or 14, further comprising signaling one or more parameters of the precoding perturbation rule.

Aspect 18: The method of any of Aspects 13-17, wherein precoding the signal using the perturbed precoding matrix is in response to a capability signaled by a receiving device.

Aspect 19: The method of any of Aspects 13-18, further comprising receiving channel state feedback including a precoding matrix indicator (PMI) based at least in part on the perturbed precoding matrix.

Aspect 20: The method of Aspect 19, wherein a PMI indicating narrow band precoding includes an indication of a request to use the perturbed precoding matrix.

Aspect 21: The method of Aspect 19, wherein the channel state feedback includes one or more parameters of the precoding perturbation rule.

Aspect 22: An apparatus for wireless communication for a receiving device, comprising: a memory storing computer-executable instructions; and at least one processor coupled to the memory and configured to execute the computer-executable instructions to perform the method of any of Aspects 1-12.

Aspect 23: An apparatus for wireless communication for a receiving device, comprising means for performing the method of any of Aspects 1-12.

Aspect 24: A non-transitory computer-readable medium storing computer executable code, the code when executed by a processor of a receiving device causes the processor to perform the method of any of Aspects 1-12.

Aspect 25: An apparatus for wireless communication for a receiving device, comprising: a memory storing computer-executable instructions; and at least one processor coupled to the memory and configured to execute the computer-executable instructions to perform the method of any of Aspects 13-21.

Aspect 26: An apparatus for wireless communication for a receiving device, comprising means for performing the method of any of Aspects 13-21.

Aspect 27: A non-transitory computer-readable medium storing computer executable code, the code when executed by a processor of a receiving device causes the processor to perform the method of any of Aspects 13-21.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication at a receiving device, comprising:
   determining a perturbed precoding matrix based on a precoding perturbation rule;
   receiving a signal that was generated based on the perturbed precoding matrix; and
   subtracting non-linearities from the received signal based on a channel estimation using the perturbed precoding matrix over one or more iterations.

2. The method of claim 1, wherein the precoding perturbation rule applies a cyclic delay diversity (CDD) across a wideband precoder.

3. The method of claim 1, wherein the precoding perturbation rule is signaled by a transmitting device.

4. The method of claim 1, wherein the precoding perturbation rule is defined in a regulation or standards document.

5. The method of claim 1, wherein one or more parameters of the precoding perturbation rule are signaled by a transmitting device.

6. The method of claim 1, wherein the perturbed precoding matrix is applied based on a capability of the receiving device or an indication signaled by a transmitting device.

7. The method of claim 1, further comprising selecting a precoding matrix indicator (PMI) to be transmitted in channel state feedback based at least in part on the perturbed precoding matrix.

8. The method of claim 7, wherein a PMI indicating narrow band precoding includes an indication of a request to use the perturbed precoding matrix.

9. The method of claim 7, wherein the channel state feedback includes one or more parameters of the precoding perturbation rule.

10. The method of claim 1, wherein subtracting the non-linearities from the received signal over an iteration of the one or more iterations comprises:
    estimating, by a linear equalizer, transmitted spatial streams from the received signal;
    precoding the estimated transmitted spatial streams using the perturbed precoding matrix;
    generating a distortion of a power amplifier at a transmitter using the precoded transmitted spatial streams as pilots; and
    passing the distortion through a channel model to determine the non-linearities.

11. The method of claim 10, further comprising estimating a channel based on the precoded transmitted spatial streams.

12. The method of claim 1, wherein a number of antenna ports at a transmitting device is greater than a number of layers of the signal.

13. A method of wireless communication at a transmitting device, comprising:
    determining a perturbed precoding matrix based on a precoding perturbation rule;
    precoding a signal using the perturbed precoding matrix; and
    transmitting the signal via a number of antenna ports that is greater than a number of layers of the signal.

14. The method of claim 13, wherein the precoding perturbation rule applies a cyclic delay diversity (CDD) across a wideband precoder.

15. The method of claim 13, further comprising signaling the precoding perturbation rule.

16. The method of claim 13, wherein the precoding perturbation rule is defined in a regulation or standards document.

17. The method of claim 13, further comprising signaling one or more parameters of the precoding perturbation rule.

18. The method of claim 13, wherein precoding the signal using the perturbed precoding matrix is in response to a capability signaled by a receiving device.

19. The method of claim 13, further comprising receiving channel state feedback including a precoding matrix indicator (PMI) based at least in part on the perturbed precoding matrix.

20. The method of claim 19, wherein a PMI indicating narrow band precoding includes an indication of a request to use the perturbed precoding matrix.

21. The method of claim 19, wherein the channel state feedback includes one or more parameters of the precoding perturbation rule.

22. An apparatus for wireless communication for a receiving device, comprising:
    a memory storing computer-executable instructions; and
    at least one processor coupled to the memory and configured to execute the computer-executable instructions to:
    determine a perturbed precoding matrix based on a precoding perturbation rule;
    receive a signal that was generated using digital post distortion based on the perturbed precoding matrix; and
    subtract non-linearities from the received signal based on a channel estimation using the perturbed precoding matrix over one or more iterations.

23. The apparatus of claim 22, wherein the precoding perturbation rule applies a cyclic delay diversity (CDD) across a wideband precoder.

24. The apparatus of claim 22, wherein the perturbed precoding matrix is applied based on a capability of the receiving device or an indication signaled by a transmitting device.

25. The apparatus of claim 22, wherein the at least one processor is configured to select a precoding matrix indicator (PMI) to be transmitted in channel state feedback based at least in part on the perturbed precoding matrix.

26. The apparatus of claim 22, wherein to subtract the non-linearities from the received signal over an iteration of the one or more iterations, the at least one processor is configured to:
  estimate, by a linear equalizer, transmitted spatial streams from the received signal;
  precode the estimated transmitted spatial streams using the perturbed precoding matrix;
  generate a distortion of a power amplifier at a transmitter using the precoded transmitted spatial streams as pilots; and
  pass the distortion through a channel model to determine the non-linearities.

27. The apparatus of claim 26, wherein the at least one processor is configured to estimate a channel based on the precoded transmitted spatial streams.

28. An apparatus for wireless communication for a transmitting device, comprising:
  a memory storing computer-executable instructions; and
  at least one processor coupled to the memory and configured to execute the computer-executable instructions to:
    determine a perturbed precoding matrix based on a precoding perturbation rule;
    precode a signal using the perturbed precoding matrix; and
    transmit the signal via a number of antenna ports that is greater than a number of layers of the signal.

29. The apparatus of claim 28, wherein the precoding perturbation rule applies a cyclic delay diversity (CDD) across a wideband precoder.

30. The apparatus of claim 28, wherein the at least one processor is configured to receive channel state feedback including a precoding matrix indicator (PMI) based at least in part on the perturbed precoding matrix.

* * * * *